United States Patent
Song

(10) Patent No.: US 11,017,799 B2
(45) Date of Patent: May 25, 2021

(54) METHOD FOR PROCESSING VOICE IN INTERIOR ENVIRONMENT OF VEHICLE AND ELECTRONIC DEVICE USING NOISE DATA BASED ON INPUT SIGNAL TO NOISE RATIO

(71) Applicant: BEIJING BAIDU NETCOM SCIENCE AND TECHNOLOGY CO., LTD., Beijing (CN)

(72) Inventor: Hui Song, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 124 days.

(21) Appl. No.: 16/160,277

(22) Filed: Oct. 15, 2018

(65) Prior Publication Data
US 2019/0206415 A1 Jul. 4, 2019

(30) Foreign Application Priority Data
Dec. 30, 2017 (CN) .......................... 201711490680.X

(51) Int. Cl.
*G10L 21/0208* (2013.01)
*G10L 15/20* (2006.01)
(Continued)

(52) U.S. Cl.
CPC ............ *G10L 25/03* (2013.01); *G10L 15/063* (2013.01); *G10L 25/84* (2013.01); *G10L 2021/02082* (2013.01)

(58) Field of Classification Search
CPC ..... G10L 21/0208; G10L 15/20; G10L 15/30; H04R 3/005
(Continued)

(56) References Cited

U.S. PATENT DOCUMENTS 9,595,997 B1 3/2017 Yang
9,659,576 B1 5/2017 Kotvis et al.
(Continued)

FOREIGN PATENT DOCUMENTS

CN 1780166 A 5/2006
CN 101710490 A 5/2010
(Continued)

OTHER PUBLICATIONS

Chinese Patent Application No. 201711490680.X First Office Action dated Jun. 30, 2020, 6 pages.
(Continued)

*Primary Examiner* — Farzad Kazeminezhad
(74) *Attorney, Agent, or Firm* — Lathrop GPM LLP

(57) ABSTRACT

The present disclosure discloses a method for processing a voice in interior environment of a vehicle, an electronic device and a storage medium. The method includes the following. A reference audio is acquired, and the reference audio is recorded to obtain a recorded audio. A pure voice is acquired. Noise data for each part or period of the recorded audio satisfying a target signal-to-noise ratio condition pertaining to that part is selected from the recorded audio, and the noise data is superimposed to the pure data to obtain a noisy voice. The noisy voice and the reference audio are inputted to an acoustic echo canceller (AEC) module as inputted data. The AEC module is configured to perform an echo cancellation operation on the inputted data to obtain training data having AEC residual noise.

17 Claims, 6 Drawing Sheets

(51) Int. Cl.
*H04R 3/00* (2006.01)
*G10L 25/03* (2013.01)
*G10L 15/06* (2013.01)
*G10L 25/84* (2013.01)

(58) Field of Classification Search
USPC .................................... 704/233, 226; 381/66
See application file for complete search history.

(56) References Cited

U.S. PATENT DOCUMENTS

| | | | | |
|---|---|---|---|---|
| 2005/0240401 | A1* | 10/2005 | Ebenezer | G10L 21/0208 704/226 |
| 2010/0189275 | A1* | 7/2010 | Christoph | H04R 3/005 381/66 |
| 2013/0231929 | A1* | 9/2013 | Komeji | G10L 15/20 704/233 |
| 2015/0003625 | A1* | 1/2015 | Uhle | G10K 11/17857 381/71.6 |
| 2019/0096398 | A1* | 3/2019 | Sereshki | G10L 21/0208 |
| 2019/0180740 | A1* | 6/2019 | Nandy | G10L 15/30 |

FOREIGN PATENT DOCUMENTS

| | | |
|---|---|---|
| CN | 103295580 A | 9/2013 |
| CN | 103650040 A | 3/2014 |
| CN | 105940445 A | 9/2016 |
| EP | 2211564 A1 | 7/2010 |
| KR | 100844176 B1 | 7/2008 |

OTHER PUBLICATIONS

Chinese Patent Application No. 201711490680.X English translation of First Office Action dated Jun. 30, 2020, 5 pages.

\* cited by examiner

METHOD FOR PROCESSING VOICE IN INTERIOR ENVIRONMENT OF VEHICLE AND ELECTRONIC DEVICE USING NOISE DATA BASED ON INPUT SIGNAL TO NOISE RATIO

CROSS REFERENCE TO RELATED APPLICATION

This application claims priority to Chinese Patent Application Serial No. 201711490680.X, filed with the State Intellectual Property Office of P. R. China on Dec. 30, 2017, by BEIJING BAIDU NETCOM SCIENCE AND TECHNOLOGY CO., LTD. and titled with "Method, Device for Processing Voice Recognition in Interior Environment of Vehicle and Electronic Device".

TECHNICAL FIELD

The present disclosure relates to the field of voice recognition technologies, and more particular to a method, a device for processing a voice in interior environment of a vehicle, an electronic device and a computer readable storage medium.

BACKGROUND

In an application scenario, echo cancellation interruption processing, for example, when waking up a playing device in the vehicle to play music, needs to recognize wake-up voice. In the process of recognizing the wake-up voice, it is necessary to perform noise suppression and echo cancellation on the wake-up voice, since various noises exist in the vehicle.

SUMMARY

A method for processing a voice in interior environment of a vehicle according to embodiments of the present disclosure includes: acquiring a reference audio, and recording the reference audio to obtain a recorded audio; acquiring a pure voice; selecting noise data satisfying a target signal-to-noise ratio condition from the recorded audio, and superimposing the noise data to the pure data to obtain a noisy voice; and inputting the noisy voice and the reference audio to an acoustic echo canceller (AEC) module as inputted data, in which the AEC module is configured to perform an echo cancellation operation on the inputted data to obtain training data having AEC residual noise.

An electronic device according to embodiments of the present disclosure includes a memory, a processor and computer programs stored in the memory and executable by the processor. When the computer programs are executed by the processor, the method for processing a voice in interior environment of a vehicle according to embodiments of the first aspect of the present disclosure is executed.

A non-transitory computer readable storage medium according to embodiments of the present disclosure has computer programs stored thereon. When the computer programs are executed by a processor, the method for processing a voice in interior environment of a vehicle according to embodiments of the first aspect of the present disclosure is executed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
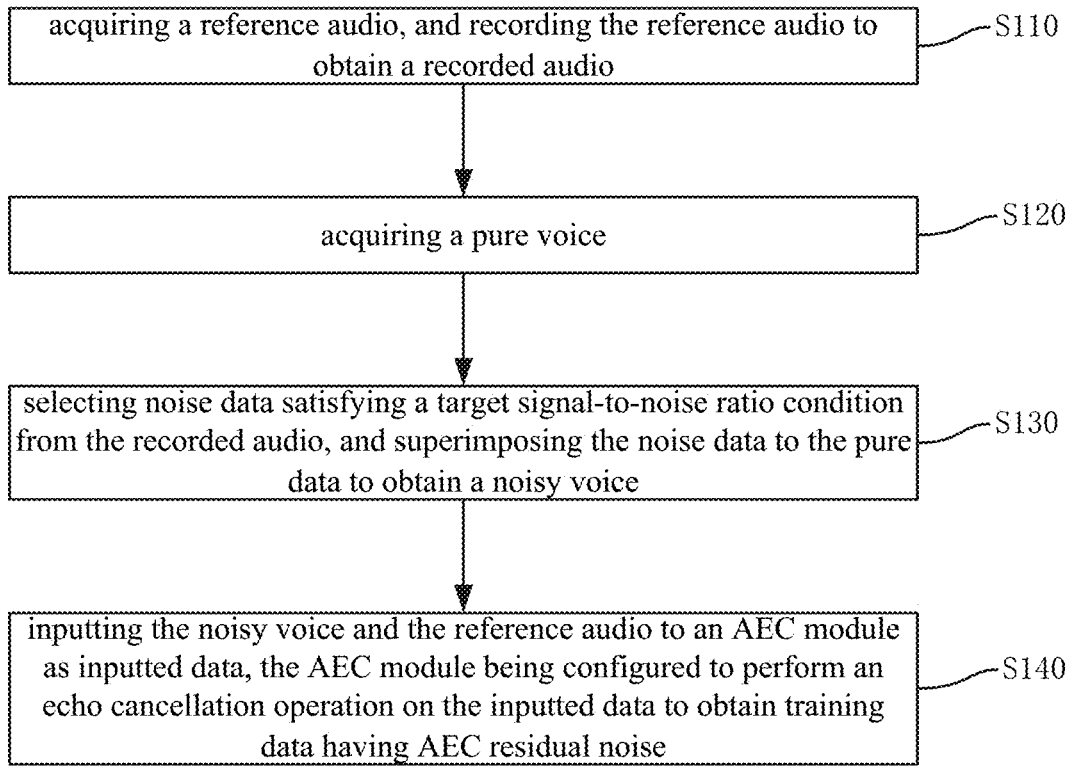
FIG. 1 is a flow chart illustrating a method for processing a voice in interior environment of a vehicle according to an embodiment of the present disclosure.

Descriptions will be made in detail to embodiments of the present disclosure. Examples of embodiments described are illustrated in drawings. The same or similar elements and the elements having same or similar functions are denoted by like reference numerals throughout the descriptions. The embodiments described herein with reference to drawings are explanatory, and used to explain the present disclosure and are not construed to limit the present disclosure.

In related arts, the echo existed is not eliminated completely. As a result, residual noise may directly affect the recognition effect of the wake-up speech. Embodiments of the present disclosure provide a method, a device for processing a voice in interior environment of a vehicle, an electronic device and a computer readable storage medium.

The method, the device for processing a voice in interior environment of a vehicle, an electronic device and a computer readable storage medium will be described with reference to drawings.

FIG. 1 is a flow chart illustrating a method for processing a voice in interior environment of a vehicle according to an embodiment of the present disclosure. It is to be explained that, the method for processing a voice in interior environment of a vehicle according to embodiments of the present disclosure may be applied to a device for processing a voice in interior environment of a vehicle according to embodiments of the present disclosure, and the device may be incorporated into an electronic device. For example, the electronic device may be an on-vehicle multimedia device. That is, a system capable of voice recognition may be arranged on the on-vehicle multimedia device, to recognize an in-vehicle voice.

As illustrated in FIG. 1, the method for processing a voice in interior environment of a vehicle may include the following.

In block S110, a reference audio is acquired, and the reference audio is recorded to obtain a recorded audio.

Alternatively, a piece of reference audio may be selected and may be recorded by an on-vehicle microphone in the interior environment of the vehicle, to obtain the recorded audio corresponding to the reference audio. It should be understood that, since the recorded audio is acquired by recording the reference audio, time duration of the recorded audio is same with that of the reference audio.

In block S120, a pure voice is acquired.

In block S130, noise data satisfying a target signal-to-noise ratio condition is selected from the recorded audio, and the noise data is superimposed to the pure audio to obtain a noisy voice.

In embodiments of the present disclosure, the target single-to-noise ratio condition may be set in advance according to actual demands. As an example, time duration of the pure voice may be determined, and a partial recorded audio having the same duration with the pure voice may be selected from the recorded audio. The noise data satisfying the target signal-to-noise ratio condition is selected from the partial recorded audio according to a pre-statistical signal-to-noise ratio distribution. Therefore, the noise data is superimposed to the pure voice to obtain the noisy voice. In embodiments, superimposing the noise data to the pure voice may be implemented by convolution superposition.

Figure 2:
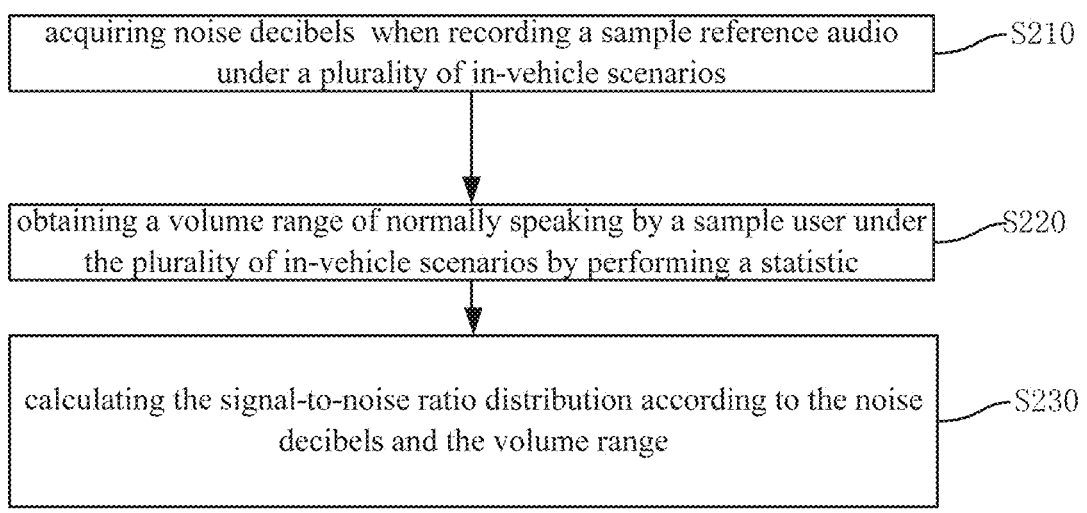
FIG. 2 is a flow chart of performing a statistic on signal-to-noise ratio in advance according to an embodiment of the present disclosure.

It is to be explained that, it is required to perform a statistic on the signal-to-noise ratios in advance to obtain the signal-to-noise ratio distribution. In addition, one of the signal-to-noise ratios needs to be specified during the noise-superimposing. Alternatively, as an example, illustrated as FIG. 2, the signal-to-noise ratio distribution may be obtained by the following.

In block S210, noise decibels during recording a sample reference audio under a plurality of in-vehicle scenarios are acquired.

It is to be explained that, it is required that the signal-to-noise ratio distribution conforms to actual environment and actual scenarios. For example, for an in-vehicle scenario, corpora of noises may be recorded under different scenarios including different traveling speeds, window-closed, window-opened, different air conditioning gears, different weathers, different traffic conditions or the like, and the noise decibels may be obtained by performing a statistic. In other words, the sample reference audio may be recorded under different traveling speeds, window-closed, window-opened, different air conditioning gears, different weathers and different traffic conditions to obtain various recorded sample audios corresponding to the sample reference audio under different in-vehicle scenarios. The statistic is performed on the noise decibels of the various recorded sample audios.

In block S220, a volume range of normally speaking by a sample user under the various in-vehicle scenarios is obtained by performing a statistic.

Alternatively, the volume range of normally speaking by the sample user may be obtained by performing the statistic under the above in-vehicle scenarios. That is to say, a statistic may be performed on volumes of speaking under the plurality of in-vehicle scenarios, such as different traveling speeds, window-closed, window-opened, different air conditioning gears, different weathers, and different traffic conditions.

In block S230, the signal-to-noise ratio distribution is calculated according to the noise decibels when recording the sample reference audio under the plurality of in-vehicle scenarios and the volume range of normally speaking by the sample user under the plurality of in-vehicle scenarios.

Alternatively, for each in-vehicle scenario, a difference between the noise decibel presented when recording the sample reference audio under the in-vehicle scenario and the volume range of normally speaking by the sample user under the in-vehicle scenario may be calculated. The difference may be determined as the signal-to-noise ratio under the in-vehicle scenario. The statistic and analysis may be performed on the signal-to-noise rations under the plurality of in-vehicle scenarios to obtain the signal-to-noise ratio distribution under the plurality of in-vehicle scenarios. For example, for a certain in-vehicle scenario, assuming that the noise decibel presented when recording the sample reference audio is 90 db and the volume value of naturally speaking by the sample user under the in-vehicle scenario is 70 db, the signal-to-noise ratio under the in-vehicle scenario may be calculated as a range from −20 db to 20 db.

In practical applications, according to the pre-statistical signal-to-noise ratio distribution, the noise data satisfying the target signal-to-noise ratio condition may be selected from the recorded audio. In other words, it may be determined according to the signal-to-noise ratio distribution which noise decibel of the audio selected from the recorded audio may be superimposed during which time period. That is, it may be determined that during which time period of the recorded, a high decibel number may be applied to the audio within that time period, and during which time period of the recorded audio, a low decibel number may be applied to the audio within that time period, according to the signal-to-signal ratio distribution. Those audios selected are determined as the noise data satisfying the target signal-to-noise ratio distribution.

In block S140, the noisy voice and the reference audio are input to an acoustic echo canceller (AEC) module as inputted data. The AEC module is configured to perform an echo cancellation on the inputted data to obtain training data having AEC residual noise.

Figure 3:
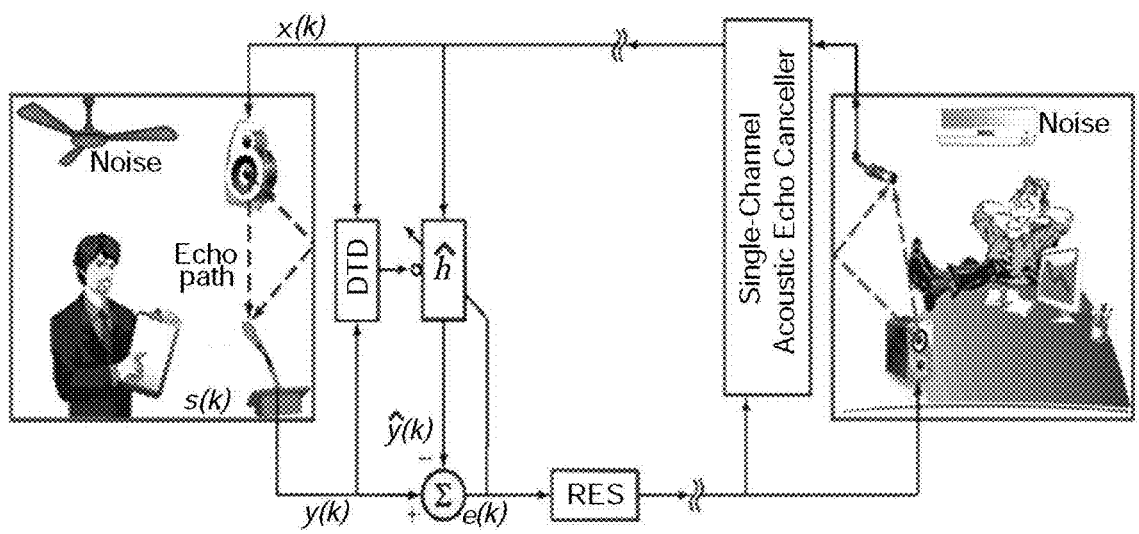
FIG. 3 is a schematic diagram of processing information by an AFC module according to an embodiment of the present disclosure.

It is to be explained that, in embodiments of the present disclosure, the AEC is used to cancel inherent noises (including music, radio broadcast, text to speech (TTS) broadcast) from a signal received by a microphone, to remain effective voice data. The AEC is an essential technical means for BargeIn disruption scenario. Implementation frames of the AEC are illustrated in FIG. 3. In embodiments of the present disclosure, the AEC module needs two inputs, one is a reference audio signal $x(k)$ which may be music, radio broadcast, TTS broadcast audio or the like, and the other one is a signal $y(k)$ received by the microphone (i.e., the above-mentioned noisy voice). Essence of the AEC module is to train an adaptive filter $h(k)$ such that the adaptive filer $h(k)$ may simulate a process of "transmitting a far-end signal to the microphone through a loudspeaker and under the interior environment of the vehicle" (that is the "echo"), and to remove the echo from the signal received by the microphone to obtain an echo-cancelled voice signal. In embodiments of the present disclosure, the adaptive filter h(k) may be trained using several algorithms, such as NLMS, frequency-domain adaptive filtering or the like. Therefore, after the noisy voice and the reference audio are inputted to the AEC module as the input data, the AEC module may perform the echo cancellation on the input data, so as to obtain the training data having the AEC residual noise.

Alternatively, in an embodiment of the present disclosure, before the noisy voice and the reference audio are inputted to the AEC module as the input data, a target time corresponding to a stating time of the noise data may be acquired from time information of the recorded audio. According to the target time, partial reference audio having the same time duration with the noise data is selected from the reference audio. In embodiments of the present disclosure, the noisy voice and the partial reference audio may be inputted to the AEC module as the input data.

In other words, in order to cancel echoes from the signal inputted via the microphone, it is required to equal the time duration of the reference audio as the inputted data to the time duration of the noise data as the inputted data, and it is required that the selected audio portions are same to each other. For example, when the noisy voice is an audio having the time duration of 20 s starting at $10^{th}$ second of the recorded audio, the reference audio taken as the inputted data is required to be an audio having the time duration of 20 s starting from the $10^{th}$ second of the pre-acquired reference audio. Therefore, it may ensure that the reference audio taken as the inputted data corresponds to the noise data taken as the inputted data, such that the echoes may be cancelled from the noise data according to the reference audio.

Alternatively, in an embodiment of the present disclosure, a training model of voice recognition in the interior environment of the vehicle may be updated in real time according to the training data having the AEC residual noise. In-vehicle Voices may be recognized according to the training model of voice recognition updated in real time.

In other words, after the training data having the AEC residual noise is acquired, the training model of voice recognition in interior environment of the vehicle may be updated in real time via an online manner. After the training model of voice recognition in interior environment of the vehicle is acquired, the in-vehicle voice may be recognized based on the training model. In embodiments of the present disclosure, the training model may be established using existing initial training data at the beginning.

Specifically, the training model may be established by the following. For example, a feature extraction is performed. Training is performed to recognize the training model, based on a deep neural network (DNN) model. Therefore, by updating in real time the training model of voice recognition in interior environment of the vehicle, recognition performance and reliability may be gradually increased, thereby improving user experience.

With the method for processing a voice in interior environment of a vehicle according to embodiments of the present disclosure, the reference audio signal and the recorded audio signal may be acquired by recording. The noise data satisfying the target signal-to-noise ratio condition is selected from the recording audio. The noise data is superimposed to the pure audio to obtain the noisy voice. The noisy voice and the reference audio are inputted to the AEC model as the input data. The voice data having the AEC residual noise is finally acquired after the processing performed by the AEC module. The voice data is determined as the training data to construct the training data having the residual noise. In practical on-line applications, the voice presented in the interior environment of the vehicle is trained and recognized using the training data having the residual noise, thereby improving effect of the voice recognition, increasing the recognition performance and reliability, and improving user experience.

Figure 4:
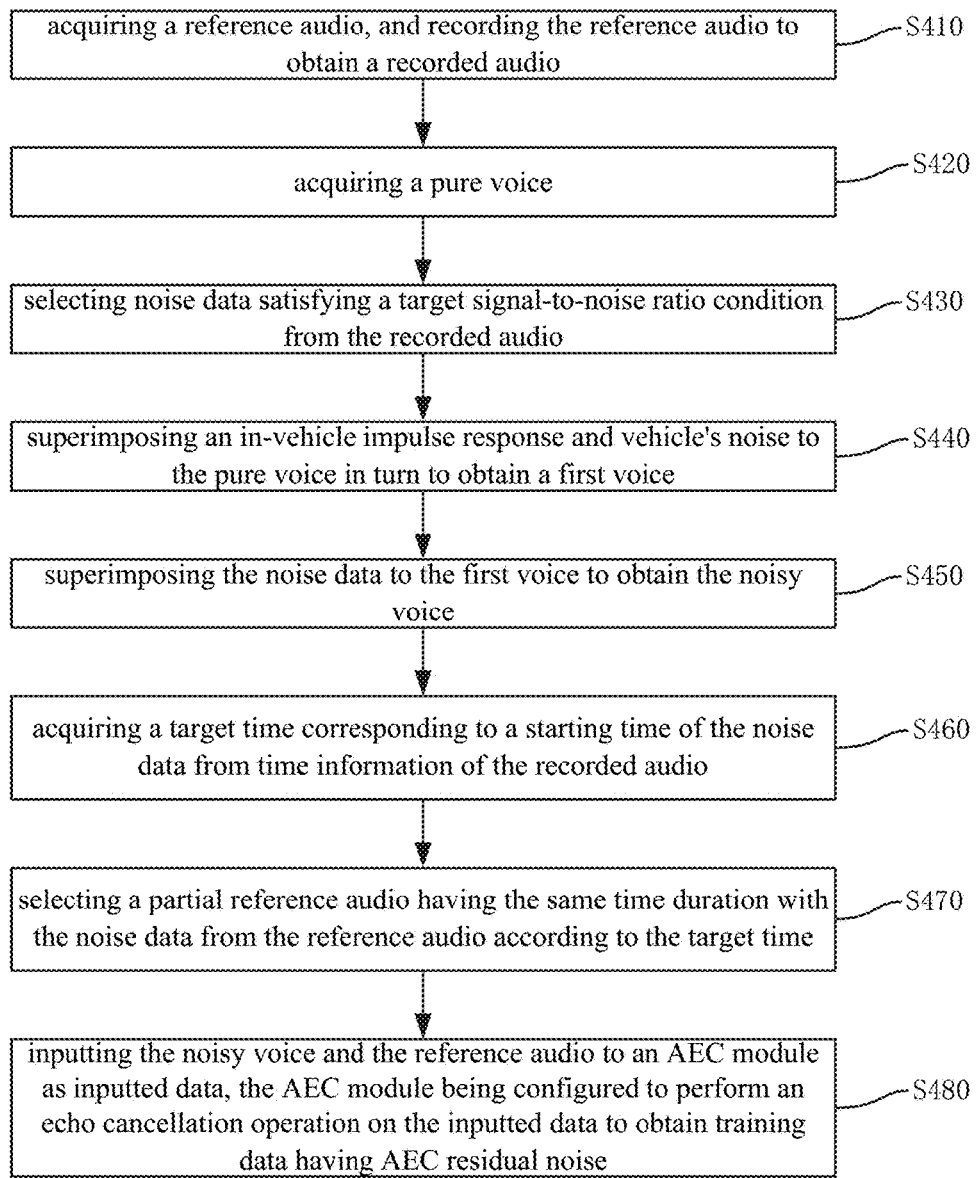
FIG. 4 is a flow chart illustrating a method for processing a voice in interior environment of a vehicle according to a specific embodiment of the present disclosure.
Figure 5:
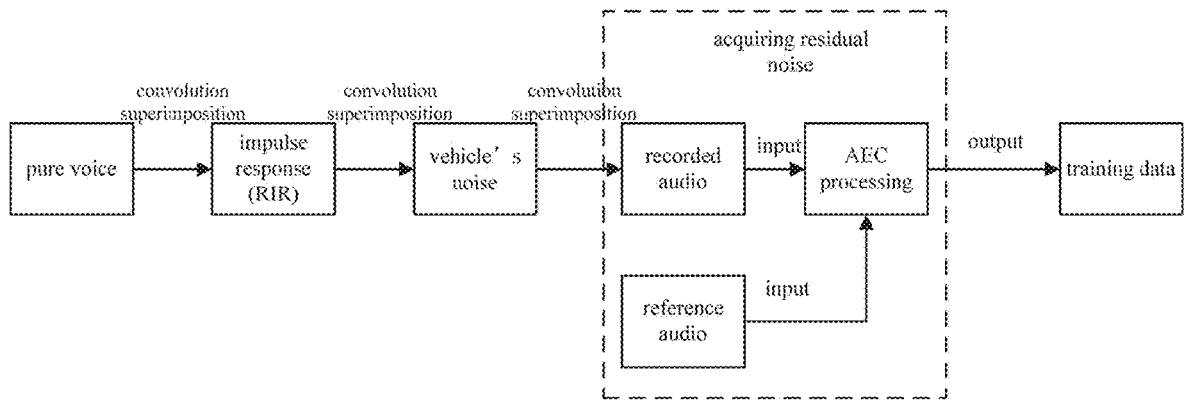
FIG. 5 is a schematic diagram illustrating a principle of a method for processing a voice in interior environment of a vehicle according to embodiments of the present disclosure.

FIG. 4 is a flow chart illustrating a method for processing a voice in interior environment of a vehicle according to a specific embodiment of the present disclosure. FIG. 5 is a schematic diagram illustrating a principle of a method for processing a voice in interior environment of a vehicle according to embodiments of the present disclosure.

In order to further improve the effect of the voice recognition and to gradually increase the recognition performance and reliability, in embodiments of the present disclosure, before the noise data is superimposed to the pure voice to obtain the noisy voice, an in-vehicle impulse response and vehicle's noise presented in the interior environment may be superimposed in turn to the pure audio. Specifically, as illustrated in FIG. 4 and FIG. 5, the method for processing a voice in interior environment of a vehicle may include the following.

In block S410, a reference audio is acquired and the reference audio is recorded to obtain a recorded audio.

In block S420, a pure audio is acquired.

In block S430, noise data satisfying a target signal-to-noise ratio condition is selected from the recorded audio.

Alternatively, time duration of the pure audio may be determined, and a partial recorded audio having the same time duration with the pure audio is selected from the recorded audio according to the time duration of the pure audio. The noise data satisfying the target signal-to-noise ratio condition is selected from the partial recorded audio according to the pre-statistical signal-to-noise ratio distribution.

As a possible implementation, the pre-statistical signal-to-noise ratio distribution may be obtained by the following. Noise decibels of noises presented when recording a sample reference audio under a plurality of in-vehicle scenarios may be acquired. A volume range of normally speaking by a sample user under the plurality of in-vehicle scenarios is acquired by performing a statistic. The signal-to-noise ratio distribution is calculated according to the noise decibels when recording the sample reference audio under the plurality of in-vehicle scenarios and the volume range of normally speaking by the sample user under the plurality of in-vehicle scenarios.

In block S440, an in-vehicle impulse response and vehicle's noise are superimposed to the pure audio in turn to obtain a first voice.

Alternatively, the in-vehicle impulse response and the vehicle's noise may be superimposed in turn to the pure audio by convolution, to obtain a voice signal having the impulse response and the vehicle's noise (i.e., the above-mentioned first voice).

In block S450, the noise data is superimposed on the first voice to obtain the noisy voice.

In block S460, a target time corresponding to a starting time of the noise data is acquired from time information of the recorded audio.

In block S470, a partial reference audio having the same time duration with the noise data is selected from the reference audio according to the target time.

In block S480, the noisy voice and the partial reference audio are inputted to an AEC module as inputted data. The AEC model is configured to perform an echo cancellation operation on the inputted data to obtain training data having AEC residual noise.

It is to be explained that, in embodiments of the present disclosure, the AEC is used to cancel inherent noises (including music, radio broadcast, text to speech (TTS) broadcast) from a microphone signal, to remain effective voice data. The AEC is an essential technical means for BargeIn disruption scenario. Implementation frames of the AEC are illustrated in FIG. 3. In embodiments of the present disclosure, the AEC module needs two inputs, one is a reference audio signal x(k) which may be music, radio broadcast, TTS broadcast audio or the like, and the other one is a signal y(k) received by the microphone (i.e., the above-mentioned noisy voice). Essence of the AEC module is to train an adaptive filter h(k) such that the adaptive filer h(k) may simulate a process of "transmitting a far-end signal to the microphone through a loudspeaker and under the interior environment of the vehicle" (that is the "echo"), and remove the echo from the signal received by the microphone to obtain an echo-cancelled voice signal. In embodiments of the present disclosure, the adaptive filter h(k) may be trained using several algorithms, such as NLMS, frequency-domain adaptive filtering or the like. Therefore, after the noisy voice and the reference audio are inputted to the AEC module as the input data, the AEC module may perform the echo cancellation on the input data, so as to obtain the training data having the AEC residual noise.

Alternatively, in an embodiment of the present disclosure, a training model of voice recognition in the interior environment of the vehicle may be updated in real time according to the training data having the AEC residual noise. In-vehicle voices may be recognized according to the training model of voice recognition updated in real time.

In other words, after the training data having the AEC residual noise is acquired, the training model of voice recognition in interior environment of the vehicle may be updated in real time via an online manner. After the training model of voice recognition in interior environment of the vehicle is acquired, the in-vehicle voice may be recognized based on the training model. In embodiments of the present disclosure, the training model may be established using existing initial training data at the beginning.

Specifically, the training model may be established by the following. For example, a feature extraction is performed. Training is performed to recognize the training model, based on a deep neural network (DNN) model. Therefore, by updating in real time the training model of voice recognition in interior environment of the vehicle, recognition performance and reliability may be gradually increased, thereby improving user experience.

With the method for processing a voice in interior environment of a vehicle according to embodiments of the present disclosure, before the noise data is superimposed to the pure voice to obtain the above-mentioned noisy voice, the in-vehicle impulse response and the vehicle's noise may be superimposed to the pure voice in turn to obtain the first voice. The noise data is superimposed to the first voice to obtain the noisy voice. The target time corresponding to the starting time of the noise data is acquired from the time information of the recorded audio. The partial reference audio having the same time duration with the noise data is selected from the reference audio according to the target time. The noisy voice and the partial reference audio are input to the AEC module as the inputted data. The AEC module is configured to perform the echo cancellation operation on the inputted data to obtain the training data having the AEC residual noise. In practical on-line applications, the voice presented in the interior environment of the vehicle is trained and recognized using the training data having the residual noise, thereby improving effect of the voice recognition, increasing the recognition performance and reliability, and improving user experience.

Figure 6:
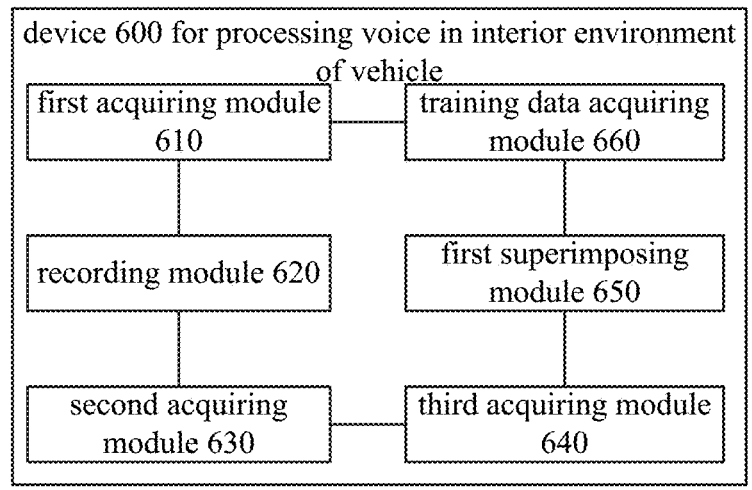
FIG. 6 is a block diagram illustrating a device for processing a voice in interior environment of a vehicle according to an embodiment of the present disclosure.

Corresponding to the above method for processing a voice in interior environment of a vehicle provided in the above embodiments, embodiments of the present disclosure further provide a device for processing a voice in interior environment of a vehicle. Since the device for processing a voice in interior environment of a vehicle corresponds to the method for processing a voice in interior environment of a vehicle provided in the above embodiments, the implementations of the method for processing a voice in interior environment of a vehicle described above are also applicable to the device for processing a voice in interior environment of a vehicle provided in embodiments, which are not elaborated herein. FIG. 6 is a block diagram illustrating a device for processing a voice in interior environment of a vehicle according to an embodiment of the present disclosure. As illustrated in FIG. 6, the device 600 for processing a voice in interior environment of a vehicle may include a first acquiring module 610, a recording module 620, a second acquiring module 630, a third acquiring module 640, a first superimposing module 650 and a training data acquiring module 660.

Specifically, the first acquiring module 610 is configured to acquire a reference audio.

The recording module 620 is configured to record the reference audio to obtain a recorded audio.

The second acquiring module 630 is configured to acquire a pure voice.

Figure 7:
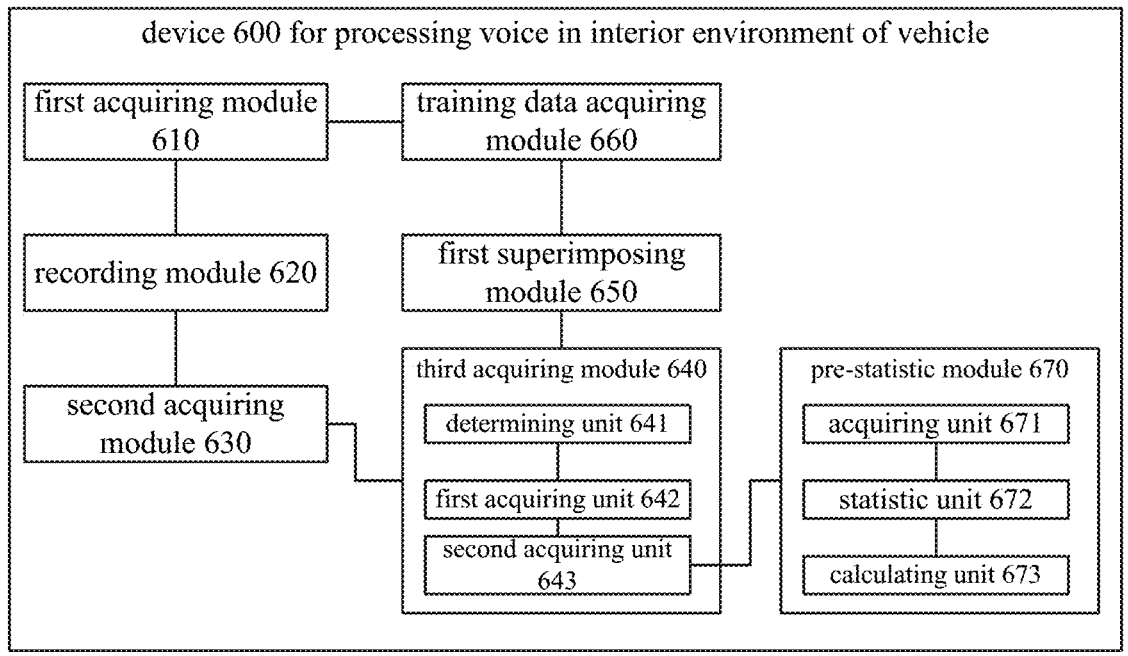
FIG. 7 is a block diagram illustrating a device for processing a voice in interior environment of a vehicle according to a specific embodiment of the present disclosure.

The third acquiring module 640 is configured to select noise data satisfying a target signal-to-noise ratio condition from the recorded audio. As an example, as illustrated in FIG. 7, the third acquiring module 640 may include a determining unit 641, a first acquiring unit 642 and a second acquiring unit 643. The determining unit 641 is configured to determine time duration of the pure voice. The first acquiring unit 642 is configured to select a partial recorded audio having the same time duration with the pure voice from the recorded audio according to the time duration of the pure voice. The second acquiring unit 643 is configured to select the noise data satisfying the target signal-to-noise ratio condition from the recorded audio according to a pre-statistical signal-to-noise ratio distribution.

The first superimposing module 650 is configured to superimpose the noise data to the pure voice to obtain a noisy voice.

The training data acquiring module 660 is configured to superimpose the noise data to the pure audio to obtain a noisy voice.

The training data acquiring module 660 is configured to input the noisy voice and the reference audio to an AEC module as inputted data. The AEC module is configured to perform an echo cancellation operation on the inputted data to obtain training data having AEC residual noise.

Alternatively, in an embodiment of the present disclosure, as illustrated in FIG. 7, the device 600 for processing a voice in interior environment of a vehicle may further include a pre-statistic module 670. The pre-statistic module 670 is configured to obtain a signal-to-noise ratio distribution by performing a pre-statistic. In embodiments of the present disclosure, as illustrated in FIG. 7, the pre-statistic module 670 may include an acquiring unit 671, a statistic unit 672 and a calculating unit 673. The acquiring unit 671 is configured to acquire noise decibels when recording a sample reference audio under a plurality of in-vehicle scenarios. The statistic unit 672 is configured to obtain a volume range of normally speaking of a sample user under the plurality of in-vehicle scenarios by performing a statistic. The calculating unit 673 is configured to calculate the signal-to-noise ratio distribution according to the noise decibels when recording the sample reference audio under the plurality of in-vehicle scenarios and the volume range of normally speaking by the sample user under the plurality of in-vehicle scenarios.

In practical applications, the noise data satisfying the target signal-to-noise ratio condition may be selected from the recorded audio according to the pre-statistical signal-to-noise ratio distribution. In other words, it may be determined according to the signal-to-noise ratio distribution which noise decibel of the audio selected from the recorded audio may be superimposed during which time period. That is, it may be determined that during which time period of the recorded, a high decibel number may be applied to the audio within that time period, and during which time period of the recorded audio, a low decibel number may be applied to the audio within that time period, according to the signal-to-signal ratio distribution. Those audios selected are determined as the noise data satisfying the target signal-to-noise ratio distribution.

Figure 8:
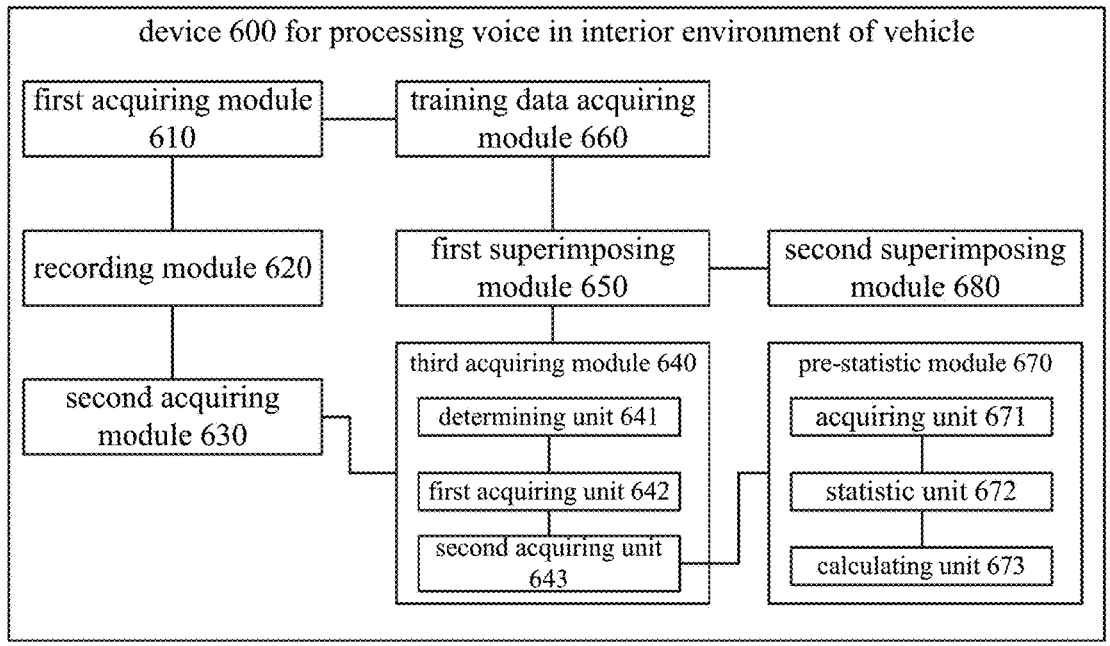
FIG. 8 is a block diagram illustrating a device for processing a voice in interior environment of a vehicle according to another specific embodiment of the present disclosure.

Alternatively, in an embodiment of the present disclosure, as illustrated in FIG. 8, the device 600 of processing a voice in interior environment of a vehicle may further include a second superimposing module 680. The second superimposing module 680 may be configured to superimpose an in-vehicle impulse response and vehicle's noise in turn to the pure audio, before the noise data is superimposed to the pure voice, to obtain the noisy voice. In embodiments of the present disclosure, the first superimposing module 650 is specifically configured to superimpose the noise data to the first voice to obtain the noisy voice.

Figure 9:
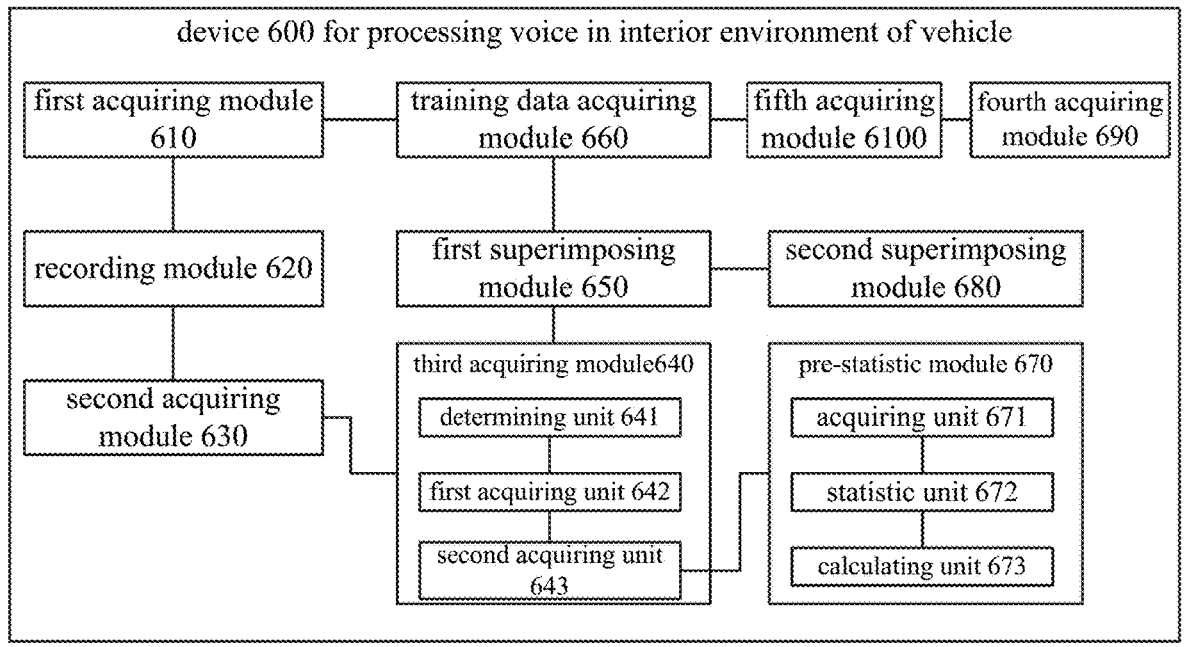
FIG. 9 is a block diagram illustrating device for processing a voice in interior environment of a vehicle according to still another specific embodiment of the present disclosure.

In order to further improve an effect of the voice recognition and gradually increase recognition performance and reliability, before the noise data is superimposed to the pure voice to obtain the noisy voice, the in-vehicle impulse response and the vehicle's noise may be superimposed in turn to the pure voice. Alternatively, in an embodiment of the present disclosure, as illustrated in FIG. 9, the device 600 for processing a voice in interior environment of a vehicle may further include a fourth acquiring module 690 and a fifth acquiring module 6100. The fourth acquiring module 690 is configured to acquire a target time corresponding to a stating time of the noise data from time information of the recorded audio. The fifth acquiring module 6100 is configured to select a partial reference audio having the same time duration with the noise data from the reference audio according to the target time. In embodiments of the present disclosure, the training data acquiring module 660 is specifically configured to input the noisy voice and the partial reference audio to the AEC module as the inputted data.

Figure 10:
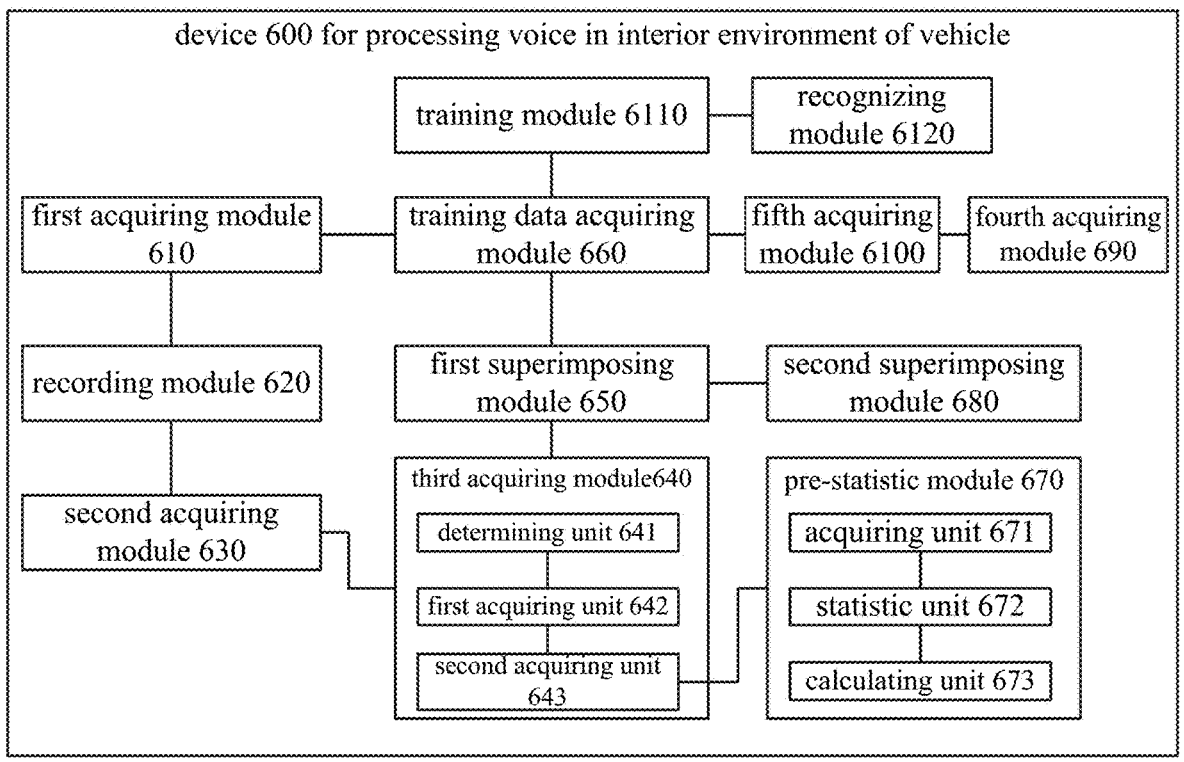
FIG. 10 is a block diagram illustrating device for processing a voice in interior environment of a vehicle according to yet another specific embodiment of the present disclosure.

Alternatively, in an embodiment of the present disclosure, as illustrated in FIG. 10, the device 600 for processing a voice in interior environment of a vehicle may further include a training module 6110 and a recognizing module 6120. The training module 6110 is configured to update in real time a training module of voice recognition in interior environment of the vehicle according to the training data having the AEC residual noise. The recognizing module 6120 is configured to recognize voices presented in the vehicle according to the real-time updated training model of voice recognition in interior environment of the vehicle. Therefore, with the real-time updated training model of voice recognition in interior environment of the vehicle, recognition performance and reliability may be gradually increased, thereby improving user experience.

With the device for processing voice recognition in interior environment of a vehicle according to embodiments of the present disclosure, the reference audio signal and the recorded audio signal may be acquired by recording. The noise data satisfying the target signal-to-noise ratio condition is selected from the recording audio. The noise data is superimposed to the pure audio to obtain the noisy voice. The noisy voice and the reference audio are inputted to the AEC model as the input data. The voice data having the AEC residual noise is finally acquired after the processing performed by the AEC module. The voice data is determined as the training data to construct the training data having the residual noise. In practical on-line applications, the voice presented in the interior environment of the vehicle is trained and recognized using the training data having the residual noise, thereby improving effect of the voice recognition, increasing the recognition performance and reliability, and improving user experience.

In order to implement the above embodiments, embodiments of the present disclosure further provide an electronic device.

Figure 11:
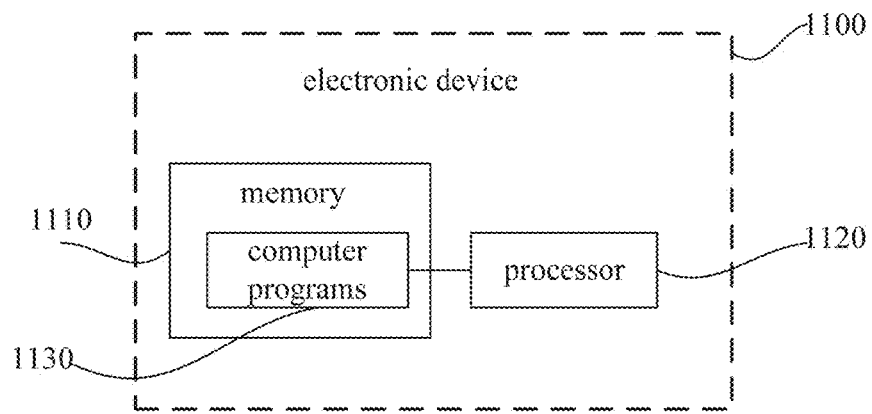
FIG. 11 is a block diagram illustrating an electronic device according to an embodiment of the present disclosure.

FIG. 11 is a schematic diagram illustrating an electronic device according to an embodiment of the present disclosure. As illustrated in FIG. 11, the electronic device 1100 may include a memory 1110, a processor 1120 and computer programs 1130 stored in the memory 1110 and executable by the processor 1120. The processor 1120 is configured to execute the above method for processing a voice in interior environment of a vehicle according to any one of above embodiments of the present disclosure when the programs 1130 are executed.

In order to implement the above embodiments, embodiments of the present disclosure further provide a non-transitory computer readable storage medium, having computer programs stored thereon. When the computer programs are executed by a processor, the method for processing a voice in interior environment of a vehicle according to any one of embodiments of the present disclosure is executed.

In the description of the present disclosure, it should be understood that, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" refers to at least two, such as two, three etc., unless specified otherwise.

In the description of the present disclosure, terms such as "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but not an exhaustive list: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for processing a voice in interior environment of a vehicle, comprising:
    acquiring a piece of reference audio, wherein the reference audio comprises music, radio broadcast or text to speech broadcast,
    obtaining a piece of recorded reference audio by recording the piece of reference audio, wherein the piece of recorded reference audio at least comprises a first part satisfying a first signal-to-noise ratio condition and a second part satisfying a second signal-to-noise ratio condition;
    acquiring a piece of pure voice;
    obtaining noise data by determining a first decibel number for the first part and a second decibel number of the second part based on a signal-to-noise ratio distribution of the recorded reference audio, wherein the signal-to-noise ratio distribution of the recorded reference audio is obtained by: obtaining pieces of recorded sample audio by recording a piece of sample reference audio in different in-vehicle scenarios, and obtaining a signal-to-noise ratio distribution of the recorded reference audio based on signal-to-noise ratios of the pieces of recorded sample audios;
    superimposing the noise data to the pure voice as a noisy voice; and
    inputting the noisy voice and the reference audio to an acoustic echo canceller (AEC) module as inputted data, wherein the AEC module is configured to perform an echo cancellation operation on the inputted data to obtain training data having AEC residual noise.

2. The method according to claim 1, wherein the signal-to-noise ratio distribution is obtained by:
    acquiring noise decibels when obtaining the pieces of recorded sample audio by recording the sample reference audio in different in-vehicle scenarios;
    obtaining a volume range of normally speaking by a sample user in different in-vehicle scenarios by performing a statistic; and
    calculating the signal-to-noise ratio distribution according to the noise decibels and the volume range.

3. The method according to claim 2, wherein calculating the signal-to-noise ratio distribution according to the noise decibels and the volume range comprises:
    for each in vehicle scenario, calculating a difference between the noise decibel when obtaining a piece of recorded sample audios by recording the sample reference audio and a volume value of normally speaking by the sample user;

determining the difference as a signal-to-noise ratio in the in-vehicle scenario; and performing a statistic on signal-to-noise ratios obtained in the in-vehicle scenarios to obtain the signal-to-noise ratio distribution.

4. The method according to claim 1, before superimposing the noise data to the pure voice as the noisy voice, further comprising:

superimposing an in-vehicle impulse response and vehicle's noise to the pure voice in turn to obtain a first voice;

wherein superimposing the noise data to the pure voice as the noisy voice comprises:

superimposing the noise data to the first voice to obtain the noisy voice.

5. The method according to claim 1, before inputting the noisy voice and the reference audio to the AEC module as the inputted data, further comprising:

acquiring a target time corresponding to a starting time of the noise data from time information of the recorded reference audio; and selecting a partial reference audio having the same time duration with the noise data from the reference audio according to the target time, wherein inputting the noisy voice and the reference audio to the AEC module as the inputted data comprises:

inputting the noisy voice and the partial reference audio to the AEC module as the inputted data.

6. The method according to claim 1, further comprising:

updating in real time a training model of voice recognition in the interior environment of the vehicle according to the training data having the AEC residual noise; and recognizing voices presented in the vehicle according to the real-time updated training model of voice recognition in the interior environment of the vehicle.

7. An electronic device, comprising a memory, a processor and computer programs stored on the memory and executable by the processor, wherein when the computer programs are executed by the processor, the processor is configured to:

acquire a piece of reference audio, wherein the reference audio comprises music, radio broadcast and text to speech broadcast, obtain a piece of recorded reference audio by recording the piece of reference audio, wherein the piece of recorded reference audio at least comprises a first part satisfying a first signal-to-noise ratio conditions and a second part satisfying a second signal-to-noise ratio condition;

acquire a piece of pure voice;

obtain noise data by determining a first decibel number for the first part and a second decibel number of the second part based on a signal-to-noise ratio distribution of the recorded reference audio, wherein the signal-to-noise ratio distribution of the recorded reference audio is obtained by: obtaining pieces of recorded sample audio by recording a piece of sample reference audio in different in-vehicle scenarios, and obtaining a signal-to-noise ratio distribution of the recorded reference audio based on signal-to-noise ratios of the pieces of recorded sample audios;

superimpose the noise data to the pure voice as a noisy voice; and input the noisy voice and the reference audio to an acoustic echo canceller (AEC) module as inputted data, wherein the AEC module is configured to perform an echo cancellation operation on the inputted data to obtain training data having AEC residual noise.

8. The electronic device according to claim 7, wherein the signal-to-noise ratio distribution is obtained by:

acquiring noise decibels when obtaining the pieces of recorded sample audio by recording the sample reference audio in different in-vehicle scenarios;

obtaining a volume range of normally speaking by a sample user in different in-vehicle scenarios by performing a statistic; and calculating the signal-to-noise ratio distribution according to the noise decibels and the volume range.

9. The electronic device according to claim 8, wherein the processor is configured to calculate the signal-to-noise ratio distribution according to the noise decibels and the volume range by acts of:

for each in-vehicle scenario, calculating a difference between the noise decibel when obtaining a piece of recorded sample audios by recording the sample reference audio and a volume value of normally speaking by the sample user;

determining the difference as a signal-to-noise ratio in the in-vehicle scenario; and performing a statistic on signal-to-noise ratios obtained in the in-vehicle scenarios to obtain the signal-to-noise ratio distribution.

10. The electronic device according to claim 7, wherein the processor is further configured to, before the noise data is superimposed to the pure voice as the noisy voice:

superimpose an in-vehicle impulse response and vehicle's noise to the pure voice in turn to obtain a first voice;

wherein the processor is configured to superimpose the noise data to the pure voice as the noisy voice by acts of:

superimposing the noise data to the first voice to obtain the noisy voice.

11. The electronic device according to claim 7, wherein the processor is further configured to, before the noisy voice and the reference audio are inputted to the AEC module as the inputted data, acquire a target time corresponding to a starting time of the noise data from time information of the recorded reference audio; and select a partial reference audio having the same time duration with the noise data from the reference audio according to the target time, wherein the processor is configured to input the noisy voice and the reference audio to the AEC module as the inputted data by acts of:

inputting the noisy voice and the partial reference audio to the AEC module as the inputted data.

12. The electronic device according to claim 7, the processor is further configured to:

update in real time a training model of voice recognition in the interior environment of the vehicle according to the training data having the AEC residual noise; and recognize voices presented in the vehicle according to the real-time updated training model of voice recognition in the interior environment of the vehicle.

13. A non-transitory computer readable storage medium, having computer programs stored thereon, wherein when the computer programs are executed by a processor, a method for processing a voice in interior environment of a vehicle is executed;

wherein the method comprises:
acquiring a piece of reference audio, wherein the reference audio comprises music, radio broadcast and text to speech broadcast,
obtaining a piece of recorded reference audio by recording the piece of reference audio, wherein the piece of recorded reference audio comprises a first part satisfying a first signal-to-noise ratio conditions and a second part satisfying a second signal-to-noise ratio condition;
acquiring a piece of pure voice;
obtaining noise data by determining a first decibel number for the first part and a second decibel number of the second part based on a signal-to-noise ratio distribution of the recorded reference audio, wherein the signal-to-noise ratio distribution of the recorded reference audio is obtained by: obtaining pieces of recorded sample audio by recording a piece of sample reference audio in different in-vehicle scenarios, and obtaining a signal-to-noise ratio distribution of the recorded reference audio based on signal-to-noise ratios of the pieces of recorded sample audios;
superimposing the noise data to the pure voice as a noisy voice; and
inputting the noisy voice and the reference audio to an acoustic echo canceller (AEC) module as inputted data, wherein the AEC module is configured to perform an echo cancellation operation on the inputted data to obtain training data having AEC residual noise.

14. The non-transitory computer readable storage medium according to claim 13, wherein the signal-to-noise ratio distribution is obtained by:
acquiring noise decibels when obtaining the pieces of recorded sample audio by recording the sample reference audio in different in-vehicle scenarios;
obtaining a volume range of normally speaking by a sample user in different in-vehicle scenarios by performing a statistic; and
calculating the signal-to-noise ratio distribution according to the noise decibels and the volume range.

15. The non-transitory computer readable storage medium according to claim 13, wherein before superimposing the noise data to the pure voice as the noisy voice, the method further comprises:
superimposing an in-vehicle impulse response and vehicle's noise to the pure voice in turn to obtain a first voice;
wherein superimposing the noise data to the pure voice as the noisy voice comprises:
superimposing the noise data to the first voice to obtain the noisy voice.

16. The non-transitory computer readable storage medium according to claim 13, wherein, before inputting the noisy voice and the reference audio to the AEC module as the inputted data, the method further comprises:
acquiring a target time corresponding to a starting time of the noise data from time information of the recorded reference audio; and
selecting a partial reference audio having the same time duration with the noise data from the reference audio according to the target time,
wherein inputting the noisy voice and the reference audio to the AEC module as the inputted data comprises:
inputting the noisy voice and the partial reference audio to the AEC module as the inputted data.

17. The non-transitory computer readable storage medium according to claim 13, wherein the method further comprises:
updating in real time a training model of voice recognition in the interior environment of the vehicle according to the training data having the AEC residual noise; and
recognizing voices presented in the vehicle according to the real-time updated training model of voice recognition in the interior environment of the vehicle.

* * * * *